United States Patent [19]
Beckerman

[11] Patent Number: 5,943,911
[45] Date of Patent: Aug. 31, 1999

[54] ELECTROMECHANICAL FRICTION CLUTCH CONTROL FOR A MANUAL TRANSMISSION

[75] Inventor: Joseph W. Beckerman, Livonia, Mich.

[73] Assignee: Borg-Warner Automotive, Inc., Sterling Heights, Mich.

[21] Appl. No.: 09/075,735

[22] Filed: May 11, 1998

[51] Int. Cl.[6] .............................. F16D 13/54; F16D 27/12
[52] U.S. Cl. .................................. 74/333; 192/90; 192/35
[58] Field of Search ................................ 74/333; 192/35, 192/84–87, 90

[56] References Cited

U.S. PATENT DOCUMENTS

| | | | |
|---|---|---|---|
| 2,072,832 | 3/1937 | Weydell | 192/90 |
| 3,000,479 | 9/1961 | Mosbacher | 192/35 |
| 3,144,107 | 8/1964 | Davies . | |
| 3,559,784 | 2/1971 | Miller . | |
| 4,582,187 | 4/1986 | Sekella . | |
| 4,773,518 | 9/1988 | Raad . | |
| 4,805,486 | 2/1989 | Hagiwara . | |
| 5,092,825 | 3/1992 | Goscenski . | |
| 5,407,024 | 4/1995 | Watson . | |
| 5,469,948 | 11/1995 | Organek . | |
| 5,485,894 | 1/1996 | Watson . | |
| 5,485,904 | 1/1996 | Organek . | |
| 5,528,950 | 6/1996 | Organek . | |
| 5,584,776 | 12/1996 | Weilant . | |
| 5,884,738 | 3/1999 | Joslin et al. | 192/35 |

*Primary Examiner*—Dirk Wright
*Attorney, Agent, or Firm*—Lyon & Artz P.L.C.; Greg Dziegielewski

[57] ABSTRACT

A friction clutch assembly in an automotive vehicle transmission is located between an engine-driven input shaft and a torque input shaft for a multiple ratio transmission. A clutch spring normally applies a clutch engaging force to the clutch assembly, thus establishing a torque flow path between the input shaft and the multiple ratio gearing. An electromechanically actuated ball ramp mechanism applies a friction clutch release force to the friction clutch assembly, thereby interrupting the torque flow path between the transmission input shaft and the multiple ratio gearing. An electromagnetic clutch actuator for the ball ramp mechanism, when it is energized, actuates the ball ramp mechanism to disengage the friction clutch. One element of the ball ramp mechanism is grounded to a transmission housing when the electromagnetic actuator is energized. Precise slip control of the friction clutch is achieved by modulating the energizing current for the electromagnetic actuator, thereby providing improved start-up performance and improving shift quality as ratio changes occur in the manual transmission.

11 Claims, 4 Drawing Sheets

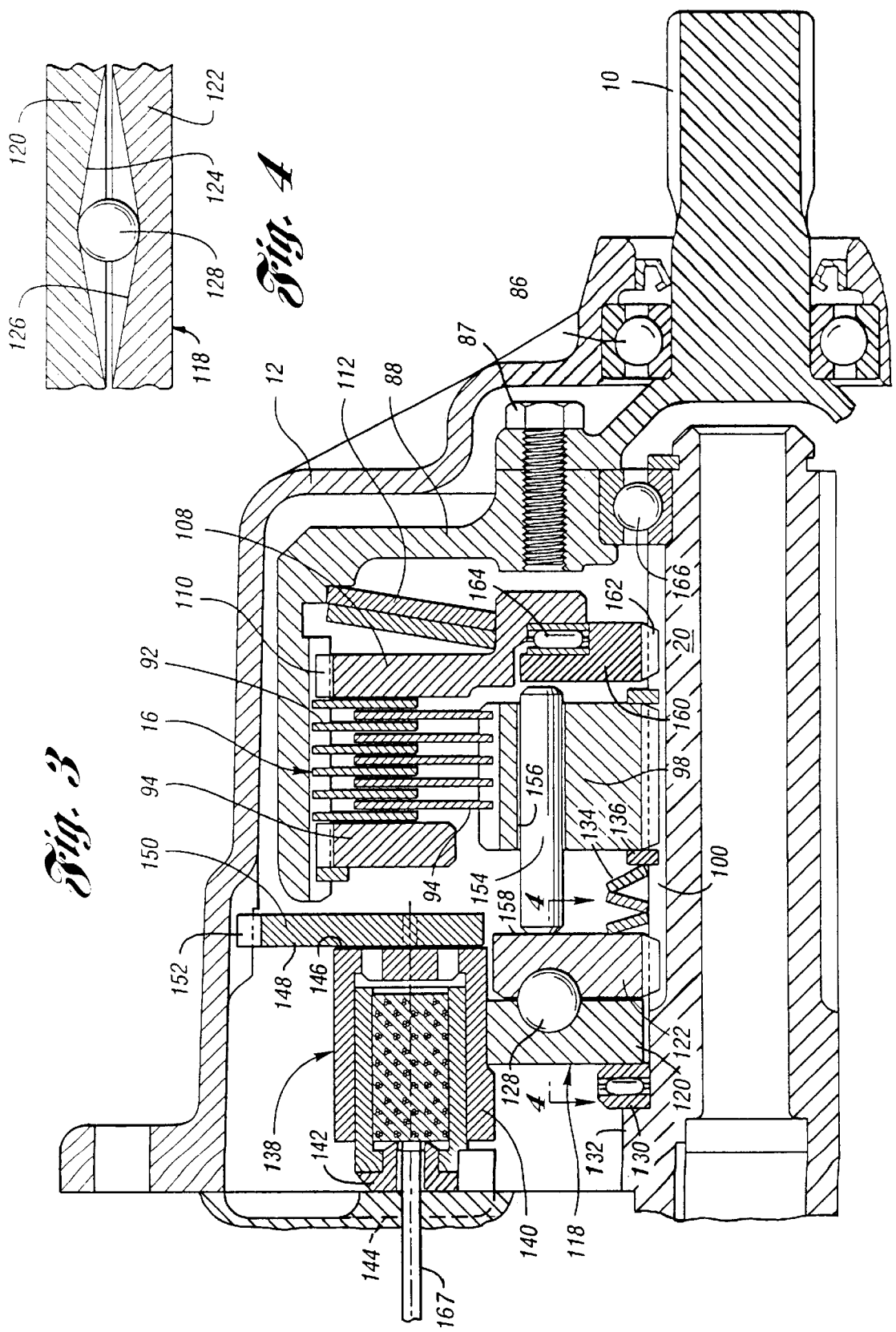

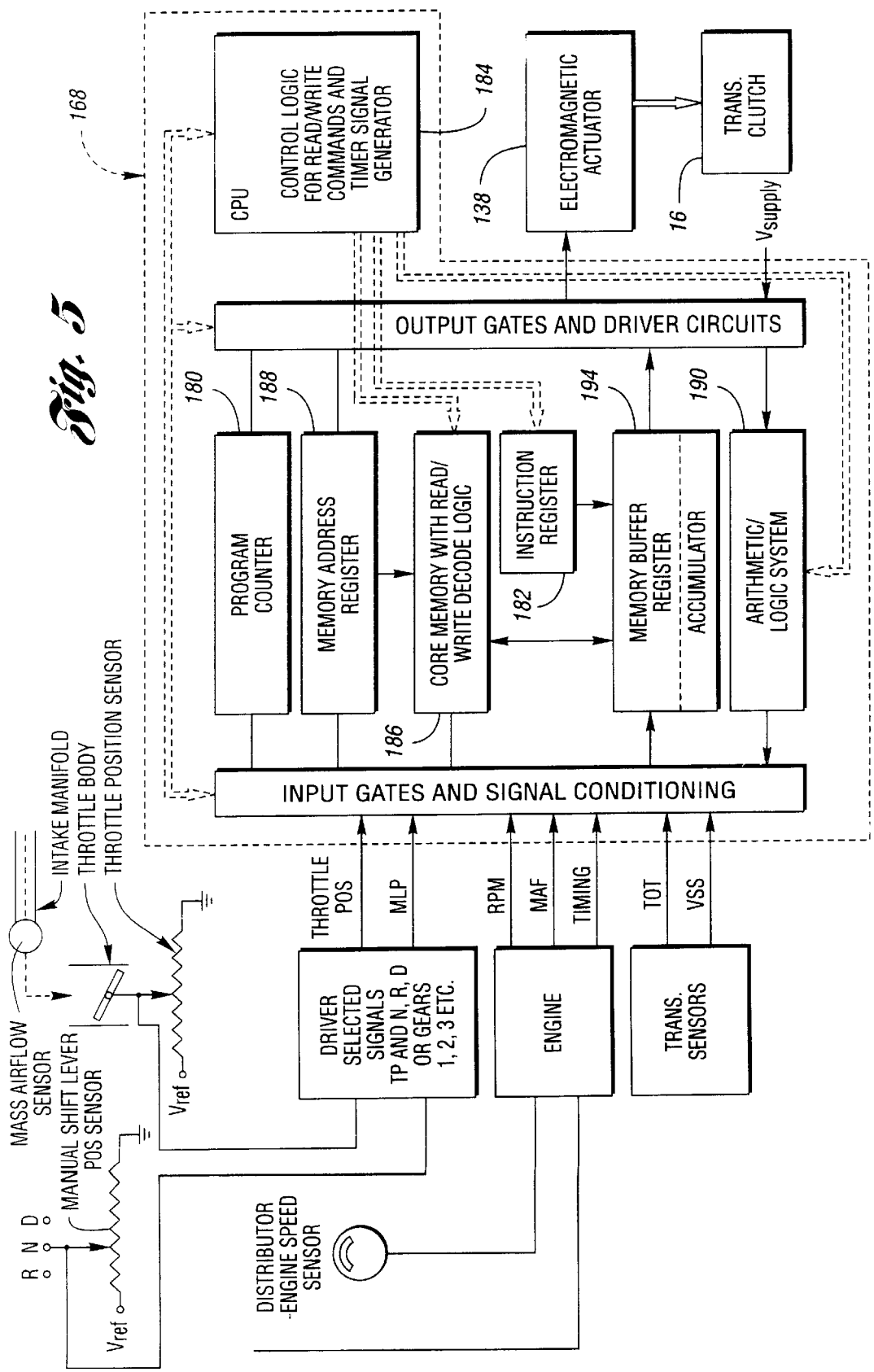

ELECTROMECHANICAL FRICTION CLUTCH CONTROL FOR A MANUAL TRANSMISSION

TECHNICAL FIELD

The invention relates to power transmissions for automotive vehicles, particularly a manual transmission having a friction clutch connecting a vehicle engine to a torque input element of the transmission.

BACKGROUND OF THE INVENTION

It is known design practice in the automotive power transmission art to provide a main drive clutch assembly for establishing and interrupting a torque flow path between an engine and torque input elements of multiple ratio gearing. The clutch is required to establish controlled torque transfer during start-up of the vehicle as well as to provide torque delivery interruption during ratio shifts of the multiple ratio gearing. Although friction clutches used in such an environment typically are actuated and released by a driver-operated clutch linkage mechanism, it is known practice in the case of semi-automatic drivelines to effect gear ratio changing functions and clutch release and engaging functions by remote clutch actuators without a direct mechanical linkage to operator controls.

Known prior art designs in which such remote actuators are used include electromagnetically actuated ball ramp actuator mechanisms that act in conjunction with friction discs of a transmission neutral clutch or main clutch to provide a clamping force against friction discs of the clutch. An example of a transmission clutch of this type may be seen by referring to U.S. Pat. Nos. 5,584,776 and 5,485,894, which are assigned to the assignee of the present invention. A fluid, pressure-operated servo actuator for actuating the ball ramp actuator mechanism for engaging a friction clutch may be seen by referring to U.S. Pat. No. 3,144,107, which discloses a ball ramp actuator mechanism for a steering clutch for a tracked vehicle. In each of these prior art designs, the ball ramp actuator mechanism consists of driving and driven side members with opposed ramp recesses and load transferring balls in the recesses. Relative angular motion of one side member with respect to the other will establish a clutch engaging force on a friction clutch assembly as the side members shift axially, one with respect to the other. In the case of ball ramp actuator mechanisms that are electromagnetically actuated, the electromagnetic coil of the actuator must be energized throughout the clutch engagement time.

Prior art clutch constructions using electromagnetically actuated ball and ramp mechanisms typically are unidirectional in their torque transfer function. If the relative rotation of the side members of the ball ramp mechanism should reverse, the clutch engaging force would be interrupted. If a clutch actuator mechanism of this type were to be used in an automotive vehicle driveline, for example, the torque reversal that would accompany a coast condition of the vehicle would result in disengagement of the friction clutch so that engine braking during coasting could not be achieved.

An example of an electromagnetically actuated ball ramp actuator mechanism for a friction clutch that incorporates a coast braking feature may be seen by referring to U.S. Pat. No. 5,469,948. That design, however, requires a relatively complex overrunning coupling and an auxiliary clutch disc whereby the overrunning coupling provides a one-way driving torque connection between one side member of a ball ramp mechanism and a disc situated between the opposing side member of the mechanism and the electromagnetic actuator. The auxiliary disc thus becomes coupled through the electromagnetic interface between the ball ramp mechanism and the electromagnetic actuator so that torque can be distributed in a reverse direction through the friction clutch mechanism associated with the ball ramp actuator.

SUMMARY OF THE INVENTION

It is an objective of the invention to provide a friction clutch apply and disconnect mechanism that can be controlled electronically to provide precise control of the torque transfer and rapid release and engagement of a main friction clutch of a manual transmission during gear ratio changes. Unlike prior art ball ramp actuator mechanisms, the clutch assembly of the invention uses clutch engaging springs for normally applying clutch engaging forces to the driving and driven discs of the clutch assembly. An electromagnetically actuated ball ramp mechanism provides an opposing force that compresses the clutch springs to release the clutch on command. The transmission main clutch in the manual transmission thus is fully engaged during a major portion of the vehicle operating time.

Unlike prior art designs, electrical current to the electromagnetic actuator for the ball ramp mechanism of the invention is not required at all times. It is required only during those instances when clutch disengagement is required. Thus, the electromagnetic actuator is energized for relatively short periods of time when the clutch is either partially or fully disengaged. This reduces the total amount of electrical energy that is required over the entire operating interval, which in turn reduces the heat input to the transmission system. It also substantially reduces clutch wear and improves durability.

During normal operation, the electromagnetic actuator of the invention is de-energized and the friction clutch is applied under spring load. Thus, the clamping load of the springs on the transmission main clutch is unaffected by any torque reversal, such as the torque reversal that occurs during coasting of the vehicle while the manual transmission is in any forward driving ratio. This ability to achieve coast braking does not require the additional clutch elements that are required in known coast braking clutch designs. Furthermore, the torque delivery path established during coast braking using the improved clutch construction of the invention does not depend upon the friction torque established at the interface of an electromagnetic actuator and an auxiliary clutch disc, as in the case of the design shown in the '948 patent.

The improved clutch assembly of the invention furthermore includes a ball ramp actuator mechanism in which the driven side of the ball ramp actuator mechanism is connected to the output side of the main friction clutch, and the driving side of the ball ramp mechanism is grounded to the transmission housing. Thus, when the main clutch is disengaged, as the electromagnetic actuator is energized, the clamping load of the ball ramp mechanism is released. Concurrently, braking action is achieved as the output side of the friction clutch becomes braked against the magnetic interface of the electromagnetic actuator. This braking action assists in accomplishing smooth transmission gear shifting. The braking at the magnetic interface also will effect a hill-hold function for preventing the vehicle from rolling when it is stopped on a grade with the friction clutch disengaged. The magnetic interface braking also provides an anti-creep feature in those instances when the clutch is released but the friction surfaces of the clutch transmit torque because of the feathering action of the friction surfaces or because of the fluid friction of the lubricating oil that lubricates the clutch surfaces.

The clutch assembly of the invention has a clutch pack having at least one friction disc connected to a clutch housing and at least one friction disc connected to a clutch torque output member. A ball ramp mechanism has first and second side members, at least one side member having a ramp recess. A force transmitting ball is held in the ramp recess.

An electromagnetic actuator in the clutch assembly of the invention comprises a coil member, an armature and a coil housing member. One of the actuator members, as well as the armature, are grounded to the transmission housing. One side member of the ball ramp mechanism is connected to one of the actuator members, and the other is connected to the clutch assembly output member. A spring normally engages the clutch pack, whereas the ball ramp mechanism releases the spring force to disengage the clutch pack.

BRIEF DESCRIPTION OF THE FIGURES OF THE DRAWINGS

FIG. 3 is an enlargement of the friction discs and clutch actuator seen in FIG. 2.

FIG. 4 is a cross-sectional view taken along the plane of section line 4—4 of FIG. 3.

FIG. 5 is a schematic system diagram for a typical automotive driveline having a manual transmission including a microprocessor for modulating the electrical energy delivered to the electromagnetic actuator for the clutch assembly of the invention.

PARTICULAR DESCRIPTION OF THE INVENTION

Figure 1:
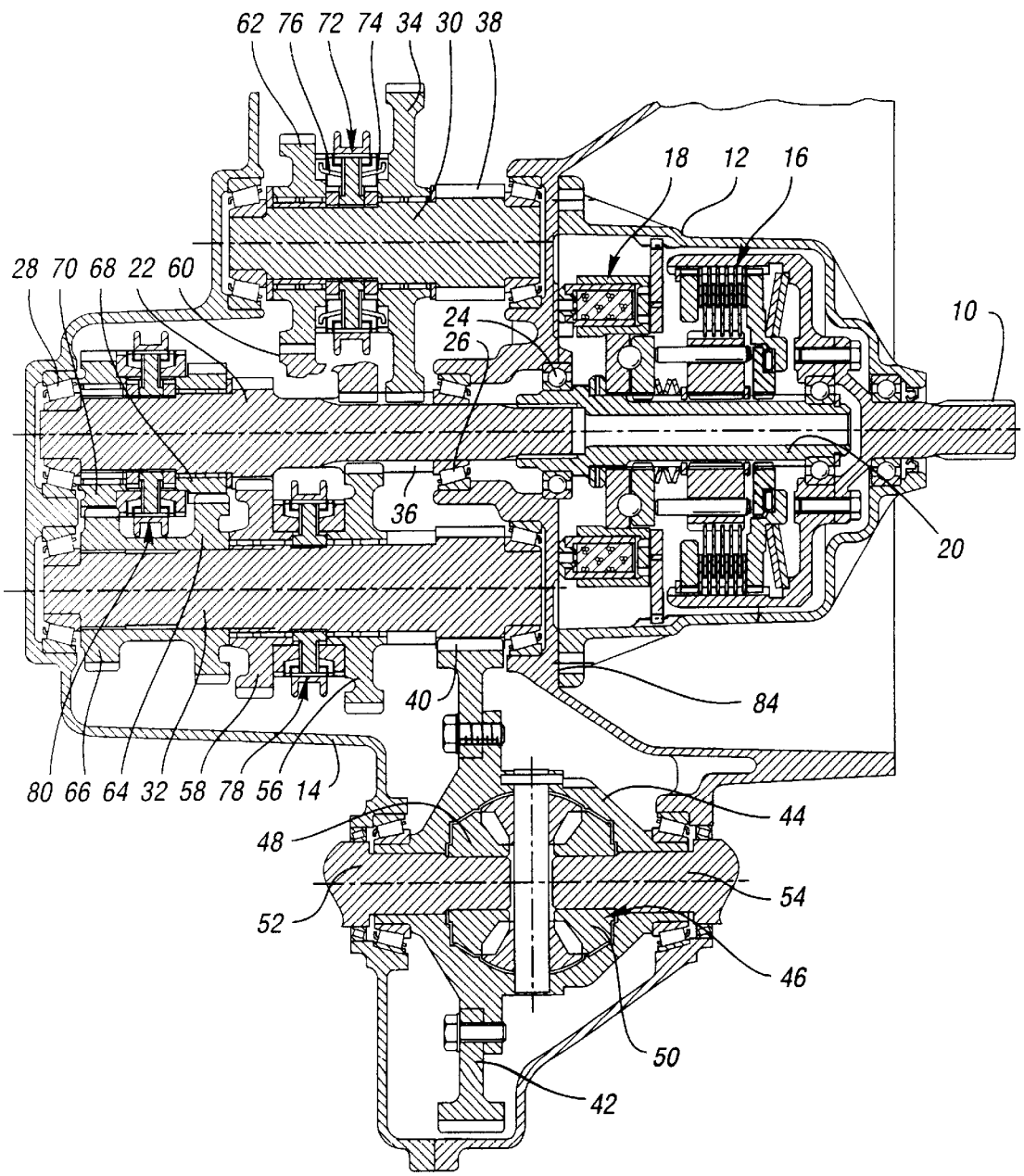
FIG. 1 is a cross-sectional view of a manual transaxle that embodies the improved clutch assembly of the invention.

In FIG. 1, numeral 10 designates a torque input shaft for a manual transaxle assembly for a front wheel drive vehicle. A crankshaft for an internal combustion engine would be coupled through a suitable damper assembly to the shaft 10.

Although a transaxle assembly is disclosed, the invention could be used as well in an in-line transmission for rear wheel drive vehicles. Furthermore, the invention may readily be adapted for use in a torque transfer case for all-wheel drive vehicles.

A clutch housing 12 is joined to a housing 14 for a manual transaxle transmission assembly. The housing 12 encloses a multiple disc clutch assembly generally indicated at 16 and an electromagnetic clutch actuator generally indicated at 18. The torque output shaft of the clutch assembly 16, which is shown at 20, is splined to the torque input shaft or mainshaft 22 of the manual transaxle. Shaft 20 is journalled at 24 in the forward wall of the transmission housing 14, and shaft 22 is straddle-mounted by spaced thrust roller bearings 26 and 28 in the transaxle housing 14.

A first-and-reverse countershaft 30 is journalled in the housing 14 parallel to the shaft 22. A second-and-third ratio countershaft 32 is journalled also in the housing 14 in spaced parallel disposition with respect to the shaft 22. Shaft 30 rotatably supports the first ratio gear 34, which meshes with a first ratio pinion 36 on the shaft 22. A first output pinion 38 also is formed on the countershaft 30. It drivably engages a torque output gear 42 supported on the carrier 44 of a torque output differential mechanism 46. A corresponding output pinion 40 is formed on shaft 32.

The carrier 44 of the differential mechanism 46 includes differential pinions that respectively engage side gears 48 and 50. These side gears are connected respectively to output half shafts 52 and 54, respectively, which in turn may be connected through universal joints in known fashion to the front driving wheels of an automotive vehicle.

A second ratio gear 56 is journalled on countershaft 32, and a third ratio gear 58 also is journalled on the countershaft 32 in spaced relationship with respect to the gear 56. Gear 56 drivably engages a reverse pinion 60, which in turn engages a reverse gear 62 journalled on the first-and-reverse countershaft 30.

A fourth ratio gear 64 and a fifth ratio gear 66 are journalled on countershaft 32. These mesh respectively with fourth ratio drive pinion 68 and fifth ratio drive pinion 70, which are journalled on shaft 22.

A first-and-reverse synchronizer clutch mechanism of well known construction is designated generally by reference numeral 72. It includes synchronizer cone clutches 74 and 76, which are arranged to selectively engage cone clutch surfaces on first ratio gear 34 and reverse ratio gear 62 when the synchronizer assembly 72 is activated. In the embodiment shown, the synchronizer clutch assembly 72 can be driver operated with a driver control linkage. It is also possible, however, that in a semi-automatic transmission, the synchronizer clutch assembly 72 can be actuated in known fashion by servo mechanisms that are controlled remotely by the operator.

The second-and-reverse gear ratio synchronizer assembly is shown generally at 78. It surrounds the countershaft 32. Like the synchronizer assembly 72, synchronizer assembly 78 includes friction cone clutches for selective engaging, respectively, the second ratio gear 56 and the third ratio gear 58. Likewise, a fourth-and-fifth ratio synchronizer clutch assembly is generally designated at 80. Like the synchronizer clutch assemblies 72 and 78, synchronizer clutch assembly 80 includes cone clutch surfaces that are actuated upon shifting movement in either axial direction.

The cone clutch surfaces on the synchronizer clutch assemblies are formed on blocker rings. Cooperating cone surfaces are formed on the respective gears or pinions. A clutch sleeve with internal clutch teeth triggers engagement of the cone surfaces in known fashion as the respective ratios for the gearing are established and disestablished upon shifting movement of the clutch sleeve. The respective blocker rings control relative motion of the respective gears or pinions until synchronism is established between that gear or pinion and the torque transfer shafts upon which they are journalled.

First forward driving ratio is achieved by shifting the sleeve for synchronizer clutch assembly 72 to the right from the position shown in FIG. 1. Torque from mainshaft 22 then is transferred from pinion 36, through gear 34, through pinion 38 through gear 42, and through the differential mechanism to the axle half shafts.

Reverse drive is achieved by shifting the sleeve for synchronizer clutch assembly 72 to the left. Torque then is delivered to gear 62 as the reverse pinion 60 reverses the direction of the torque. The output pinion 38 and the output gear 42 then are driven in a reverse direction.

Second forward driving ratio is achieved by shifting the sleeve for synchronizer clutch assembly 78 to the right. Torque is delivered from shaft 22, through gear 56, through countershaft 32, through pinion 40 and through gear 42 to the differential mechanism.

Third ratio is achieved by shifting the sleeve for synchronizer clutch assembly 78 in the left direction. Torque then is transferred from shaft 22, through gear 58, through countershaft 32 and through pinion 40 to gear 42.

Fourth ratio is achieved by shifting the sleeve for synchronizer clutch assembly 80 to the right. Torque then is transferred from shaft 22, through pinion 68, through gear 64 and countershaft 32, and through pinion 40 to gear 42.

Fifth ratio is achieved by shifting the sleeve for synchronizer clutch assembly 80 to the left, which couples pinion 70 to gear 66. Torque then is delivered through countershaft 32 and pinion 40 to gear 42.

Figure 2:
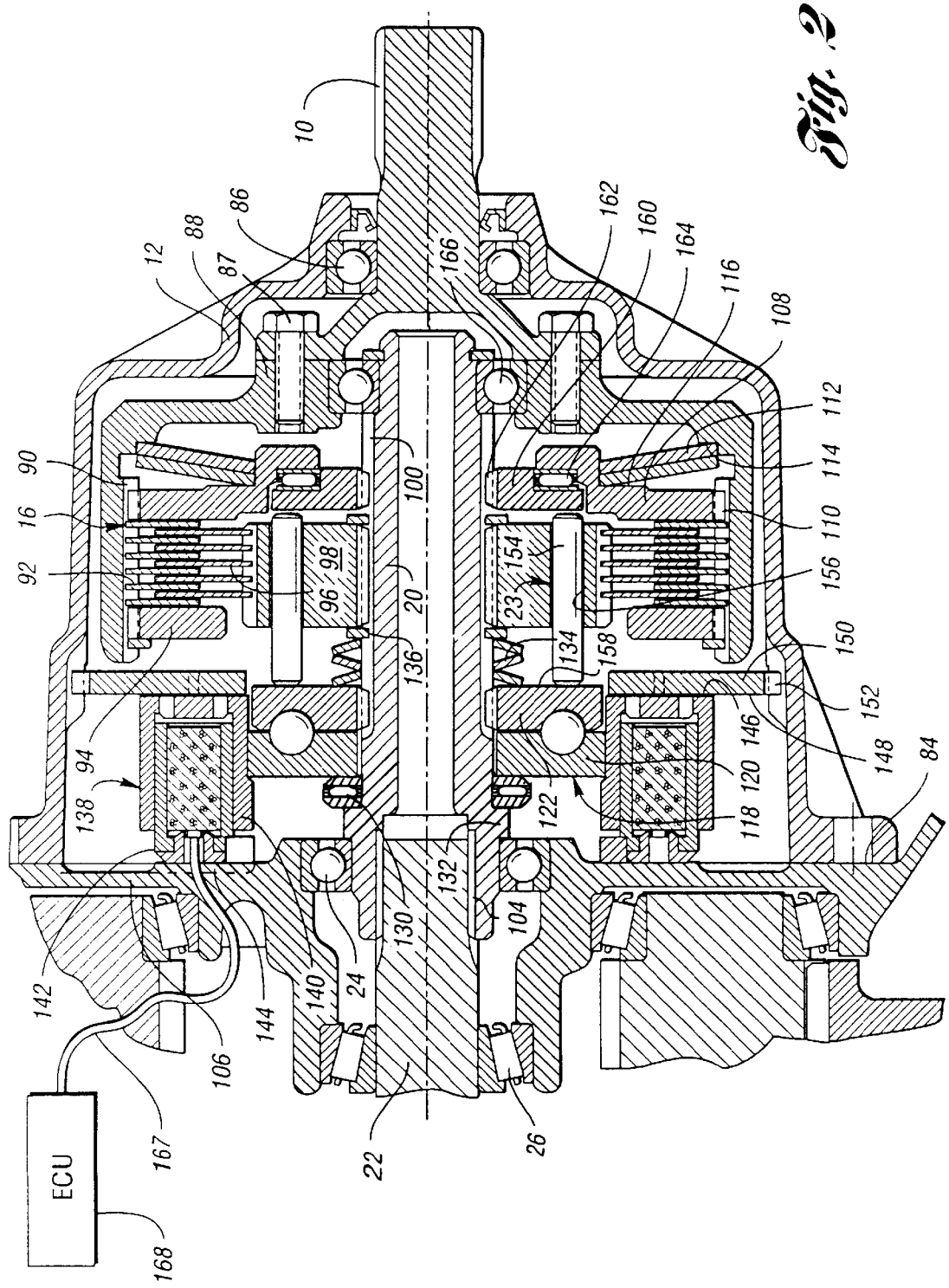
FIG. 2 is an enlargement of the clutch assembly shown in the assembly view of FIG. 1.

The clutch assembly 16, which embodies the invention, is shown in enlarged form in FIGS. 2 and 3. The clutch 16 is situated in clutch housing 12 which is secured at the left margin 84 to the transaxle housing 14, preferably by bolts (not shown). The engine-driven torque input shaft 10 is journalled in a bearing opening by means of bearings 86. The input shaft 10 is secured by bolts 87 or other suitable fasteners to a clutch drum 88, which is internally splined at 90 to externally splined clutch friction disc separator plates 92. A clutch plate backup ring 94 is externally splined by spline teeth on one side of the clutch disc pack of which the separator discs 92 form a part. An internal snap ring takes the reaction force of the clutch pack engaging force.

Internally splined friction clutch discs 96 are situated in interdigital relationship with respect to the separator plates 92. The discs 96 are splined to an externally splined hub 98. The hub 98 has a central opening with internal spline teeth that register with external spline teeth 100 on transaxle torque input shaft 20, which is the clutch assembly torque output shaft. Transmission mainshaft 22 is splined, as shown at 104, to the shaft 20 and is supported by bearing 24, which is common to the shaft 22. Bearing support wall 106 for the bearing 24, as well as for the bearing 26, forms a part of the transaxle housing 14.

An annular clutch apply plate 108 is slidably splined on its outer periphery 110 on the internal splines 90 of the clutch drum 88. Belleville washer springs 112, preferably two in number, are disposed between a shoulder 114 in the clutch drum and a circular shoulder 116 formed in the clutch apply plate 108. The Belleville washer springs 112, when the clutch pack is assembled as shown in FIGS. 2 and 3, are pre-stressed so that a clutch apply force normally acts on the clutch pack, thereby tending normally to engage the clutch pack to establish a frictional driving connection between input shaft 10 and shaft 20.

A ball ramp actuator mechanism is designated in FIGS. 2 and 3 by reference character 118. It comprises a driving side member in the form of an annular ring 120 and a driven side member in the form of an annular ring 122. Each side member is formed with a ball ramp at peripherally spaced locations about the axis of the shaft 20, although only one side member may be ramped if that is desired. The ball ramps are indicated in FIG. 4 by reference numerals 124 and 126, respectively. Situated between the ball ramps 124 and 126 is a series of actuator balls 128, one ball being situated between each registering pair of ramps 124 and 126.

The driven side member or disc shown at 122 is splined as shown to external spline teeth 100 on the shaft 20. A radial needle thrust bearing 130 is situated between the driving side member or disc 120 and a reaction shoulder 132 on the shaft 20.

Belleville springs 134 encircle the shaft 20 and are situated between the driven side member or disc 122 and a snap ring 136 secured to the shaft 20. Snap ring 136 acts as a reaction point for the springs 134.

An electromagnetic actuator for the ball ramp mechanism is generally identified in FIGS. 2 and 3 by reference numeral 138. It includes a coil housing 140 which is secured fast to the outer periphery of the driving side member or disc 120. The side member or disc 120 surrounds the shaft 20 but is not secured to it. An electromagnetic coil assembly 142 is disposed in the coil housing 140 and is secured in fixed fashion to the transverse bearing support wall 106 which, as mentioned previously, forms a part of the transaxle housing 14. This connection, which is generally indicated at 144, may be made using known fastening techniques.

The coil housing has an electromagnetic clutch friction surface 146, which is situated in close proximity to a friction surface 148 of a clutch actuator armature plate 150. The outer periphery of the armature plate 150 is splined at 152 to the housing 12. The armature plate is capable of being adjust axially, although angular motion of the armature plate is prevented.

Load transfer pins 154 are received in clearance bores 156 formed in the hub 98. The left end of the pins 154 are disposed adjacent an annular side surface 158 on the driven side member or disc 122. The right-hand end of the pins 154 engages a load transfer ring or thrust ring 160, which has an internally splined central opening, as shown at 162, with which the spline teeth 100 of the shaft 20 register. An anti-friction thrust bearing, which may be a radial needle bearing as shown at 164, is situated between the load transfer ring 160 and the clutch apply plate 108.

The right-hand end of the shaft 20 is journalled on bearing 166 situated in a bearing opening in the clutch drum 88.

The electromagnetic coil assembly 142 is connected electrically by a lead, schematically illustrated at 167, to an electronic control unit 168 which will be described subsequently.

When the electromagnetic clutch actuator is energized, the electromagnetic clutch interface between the armature and the coil housing surface 146 is capable of transmitting reaction torque to the housing 12. At that time, the driving side member or disc 120 becomes braked or grounded to the housing 12. Although the electromagnetic coils for the actuator 138 are held stationary by the transaxle housing, the clutch coil housing 140 is rotatable with the driving side member 120. When the rotatable coil clutch housing 140 is braked by the armature plate, side member 120 is anchored. If at that time the torque is being transmitted through shaft 20, the ball ramp mechanism will cause the side member 122 to shift in a right-hand direction due to the thrust component established by the cam surfaces and the thrust transmitting balls 128. Shifting movement of the driven side member or disc 122 will cause the load transfer pins 154 to be engaged by the side member 122, thereby shifting the load transfer pins into engagement with the load transfer ring 160. This will compress the springs 112, thereby releasing the clutch pack.

By modulating the voltage made available to the electromagnetic clutch coil, the clutch engaging force can be varied between a fully disengaged condition and a fully engaged condition. When the clutch is disengaged, full electrical current is made available to the electromagnetic clutch actuator as surfaces at the magnetic interface are attracted, one to the other. This results in application of torque to the ball ramp mechanism, and the clutch clamping load is released. Simultaneously, a braking action is applied to the output side of the clutch due to the surfaces at the magnetic interface at the electromagnetic coil housing, which now are frictionally engaged. Although the clutch pack is released in this fashion, a braking action still can be achieved by the armature and coil housing. This aids transmission gear shifting as will be described subsequently. It also achieves an inherent anti-creep feature as well as a hill-hold feature for the driveline.

In order to reduce the torque transmitted across the clutch pack, up to and including a condition of complete release, a microprocessor that forms a part of the electronic control unit 168 will cause a controlled level of electrical current to be applied to the electromagnetic coil of the electromagnetic actuator. This grounds the electromagnetic coil housing 140 to the transmission housing 12 through the armature plate 150. Initially, the coil housing 140 rotates at the speed of the input shaft 10.

The reaction force due to the axial load resulting from the forced separation of the ball ramp side members is transmitted to the transmission housing through the anti-friction bearing 164. A normal collapsed position and a minimum separation between the ball ramps is maintained by springs 134. As the ball ramps separate the side members of the ball ramp mechanism, the springs 134 are compressed and an axial load is applied to the load transfer pins 154. This releases the clutch pack as the load transfer ring 160 and the load transfer pins 154 are forced to rotate at the output shaft speed. The force transmitted through the load transfer ring causes the clutch apply springs 112 to compress, which reduces the clutch pack apply force. The torque transmitting capacity of the clutch pack then is reduced according to the level of loading applied in response to the variable level of electrical current supplied to the electromagnetic actuator. When the clutch pack is completely released, the magnetic force of attraction at the interface of the coil housing 140 and the armature 150 results in a braking action that tends to slow and ultimately to stop rotation of the output shaft 20.

The electronic control unit uses a microprocessor that responds to input signals from the driveline, including operator shift commands, transmission gear selection, engine speed, throttle position, output shaft speed and vehicle speed.

FIG. 5 shows a generic microprocessor that may be used with the electronic control unit 168. The elements of the microprocessor include a program counter 180, which may function as a general register as in the case of the registers of the instruction register 182, but it also contains the address of the instruction that is to be executed following the entry or retrieval of the instruction or data currently in the process of being executed by the control logic section 184. The core memory for the microprocessor, seen at 186, contains a read/write logic as well as decoder logic. A memory address register 188 usually is provided in a processor of this type to store the currently addressed memory location. The arithmetic logic for the microprocessor is carried out at location 190 for the purpose of combining words retrieved from different registers, for example, or by carrying out other operations on the data or the words, such as adding, subtracting or shifting. The control logic at location 184 decodes the digital information of the instruction that is currently located in the instruction register to generate certain logic or timing pulses that may be used by the arithmetic logic system 190.

The processor may be an integrated central processor which has the capacity for controlling engine functions as well as transaxle functions, but a stand-alone processor also may be used for the clutch assembly 16. The processor converts signals such as the signals from a vehicle speed sensor (VSS), an engine throttle position sensor, a transmission oil temperature sensor (TOT), a manual gear shift lever position sensor (MLP), and a mass air flow meter (MAF) into electrical signals. These are received by the processor, which operates on them in accordance with program control strategy. The processor includes appropriate gates and driver circuits for delivering the output of the operation of the strategy to electromagnetic actuator 138.

The mass air flow (MAF) may be used as one of the variable inputs to compute engine torque, but other variables could be used instead of or in conjunction with MAF. For example, intake manifold pressure, timing and throttle position could be appropriate for some applications.

The processor logic section or central processor unit (CPU) 184 has a read-only memory (ROM) shown at 186, in which the programs containing the control strategy and calibration data are stored, as well as a read-write memory (RAM) 194 and internal busses between the memory and the central processor arithmetic logic unit 190.

Computations are carried out on the input data and stored in RAM where the result can be addressed, fetched, erased, rewritten or changed depending on the operating conditions.

The data that may be read from a first memory location, as the processor seeks an instruction from memory, is fed into a data register and storage area and then to an instruction decoder. When the instruction is to be carried out, the data that is fetched is transferred to the arithmetic logic unit. Then sequentially, pursuant to instructions of the instruction decoder, other data may be fetched from memory and fed into the data registers. Also sequentially, the data in the accumulator may be transferred to the data register and then fed back into memory and stored in the next memory location within the random access memory where it may be addressed during the next background loop. The data that is stored, for example, may be engine rpm that is instantaneously delivered by the engine speed sensor. Using that data, the memory address for the data located is transferred to the arithmetic logic system. Under the control logic of the CPU, engine torque available to the torque input side of the clutch then can be computed.

If the transmission ratio is known, an appropriate piece of data stored in a table in memory, depending upon the transmission ratio that exists during the instant of the background loop, can be identified and used as a multiplier for incrementing or decrementing the engine torque delivered to the input side of the clutch. These computations occur repetitively and sequentially during each background loop in known fashion.

The time between the initiation of the clutch pack engagement and the completion of the clutch pack engagement can be controlled in this fashion. This includes synchronization of the rotating elements of the gearing on the input and output sides of the synchronizer clutch assemblies 72, 78 and 80. Synchronism thus can be precisely controlled during ratio changes.

In a control strategy that uses feedback control of the clutch application and release, the relevant instantaneous speeds of the input side of the clutch and the output side of the clutch can be monitored during the shift interval. These speeds are computed during each background loop of the processor. If desired, an open loop control can be characterized by a PID controller to augment the clutch pack engagement and release quality.

During start-up of the vehicle from a standing start, the operator turns the engine ignition to the "on" position. This delivers full current to the electromagnetic clutch actuator 18, which releases the clutch. The transmission then can be shifted by the operator to neutral.

Upon engine start-up, the input shaft rotation with the clutch locked will equal output shaft rotation; so when the electromagnetic clutch actuator is energized, an attempt to rotate the output shaft results in clutch release. The output shaft is braked under these conditions by the electromagnetic clutch magnetic interface, which is grounded by the armature 150 to the transmission housing. If the engine rpm should increase when the transmission is in first gear and the engine rpm exceeds cranking speed, the transmission can be shifted to neutral as the clutch pack engages.

If the vehicle is at rest and the clutch is disengaged and first gear is selected, an increase in throttle setting will reduce the current to the electromagnetic coil of the electromagnetic actuator using the variable microprocessor inputs. The current delivered to the electromagnetic coil then is modulated, thereby controlling the clutch engagement for start-up.

On an upshift from a first underdrive ratio to a higher underdrive ratio or to a direct-drive ratio, the transmission neutral state first is selected. Under these conditions, the magnetic interface brake to the transmission casing will slow the input shaft rotation. This is necessary if a smooth synchronous shift is to be made to the next higher gear ratio. If the friction at the electromagnetic interface at the armature plate is insufficient to slow the input shaft speed to the desired amount for a smooth ratio shift, the reverse synchronizer assembly 72 can be moved slightly to a reverse drive position, thereby slowing further the input shaft speed because of the braking action of the reverse synchronizer cone clutch described previously. The upshift can then occur when the input shaft has slowed sufficiently as the clutch pack engages. The arithmetic logic system of the processor will determine when synchronism is attained by comparing computed speeds of the rotating elements that are involved.

In the case of a downshift from a high ratio to a lower underdrive ratio, the magnetic interface brake at the armature 150 will tend to slow the speed of the input shaft. To achieve a smooth synchronous downshift, however, it is necessary for the input shaft to be speeded up relative to the speed of shaft 20. The input shaft speed can be increased by partially engaging the first ratio synchronizer clutch assembly 72 which tends to overcome the magnetic brake effect. Under certain conditions, the magnetic brake effect at the armature 150, together with the speed-up effect of the first speed ratio synchronizer assembly, may be insufficient to establish synchronism. Under these conditions, engine throttle-controlled speed matching can be used. This involves the engagement of the clutch pack as the engine speed is increased. When the input shaft speed is increased so that it matches a selected gear ratio, the downshift may occur. The control can then be returned to the operator after a downshift under the control of the microprocessor has achieved a synchronous condition.

When the vehicle is slowed and approaches a stop, the transmission is downshifted as the vehicle slows to a predetermined speed. When the vehicle speed drops below the threshold value, the clutch disc pack is disengaged as the microprocessor responds to the variable inputs. Under these driving conditions, when the vehicle is at rest and the throttle signal corresponds to a zero throttle setting, the transmission can be shifted by the operator to neutral. The disc pack then can be engaged as the driveline is conditioned for a subsequent selection of the drive state by the operator.

Although a particular embodiment of the invention has been disclosed, it is contemplated that a person skilled in the transmission art may make modifications to the disclosed design without departing from the scope of the invention. The following claims are intended to cover such modifications as well as equivalents thereof.

What is claimed is:

1. A friction clutch assembly in a power transmission mechanism defining a torque flow path from an engine driven transmission torque input member to a transmission torque output member, said torque input and torque output member being journalled in a transmission housing;

a friction clutch housing, at least one torque input friction disc connected to said clutch housing and at least one torque output friction disc, a friction disc pressure plate being connected to said clutch housing;

a clutch assembly torque output member connected to said torque output friction disc;

a ball and ramp actuator assembly comprising first and second annular side members with juxtaposed annular planar surfaces;

at least one side member of said ball and ramp actuator having a ramp recess of varying depth in its planar surface;

a force transmitting ball in said ramp recess and engageable with each of said side members;

an electromagnetic actuator comprising an electromagnetic coil member, a coil housing member, and an armature, one of said electromagnetic actuator members being anchored to said transmission housing;

said coil housing member and said armature being disposed in close proximity, said armature being connected to said transmission housing and axially shiftable thereon;

one of said side members of said ball and ramp actuator being connected to the other of said actuator members and the other of said side members being connected to said clutch assembly torque output member;

spring means disposed between said clutch housing and said friction discs whereby said clutch assembly is normally engaged to effect a torque flow path between said transmission torque input member and said clutch assembly torque output member; and force transmitting elements disposed between said pressure plate and said other actuator side members whereby said friction disc assembly is disengaged when said electromagnetic coil is energized.

2. The clutch assembly as set forth in claim 1 wherein the connection between said torque output friction disc and said clutch assembly torque output member comprises a clutch disc hub connected drivably to said torque output friction disc;

said pressure plate including a release ring surrounding said clutch assembly torque output member; and clutch assembly release elements extending through said clutch disc hub between said release ring and said other side member of said ball and ramp actuator to effect clutch assembly disengagement upon axial shifting movement of said other actuator side member as said electromagnetic coil is energized.

3. The clutch assembly as set forth in claim 2 wherein said friction discs are part of a multiple disc clutch pack including multiple torque input discs connected to said clutch housing and multiple torque output discs mounted to said clutch disc hub.

4. The clutch assembly as set forth in claim 1 wherein said one electromagnetic actuator member is said coil housing member and said other of said electromagnetic actuator member is said coil member.

5. The clutch assembly as set forth in claim 2 wherein said one electromagnetic actuator member is said coil housing member and said other of said electromagnetic actuator member is said coil member.

6. A clutch assembly for a multiple ratio power transmission mechanism for use in a vehicle driveline to transfer torque from a vehicle engine to a transmission mechanism torque output shaft;

said transmission mechanism comprising a mainshaft and at least one countershaft journalled in a transmission mechanism housing, said mainshaft and said countershaft having drivably engageable pinions and gears journalled thereon;

at least one forward drive synchronizer clutch means and a reverse drive synchronizer clutch means for selectively establishing and disestablishing, when activated, geared torque flow paths between said mainshaft and said countershaft;

a torque output gear drivably connected to said torque output shaft;

one of said pinions being a torque output pinion drivably connected to said torque output gear;

said clutch assembly having a clutch housing connected drivably to said engine, a clutch assembly torque output shaft and a clutch assembly hub, said mainshaft being connected to said clutch assembly torque output shaft and said hub being connected to said clutch assembly torque output shaft;

a friction disc clutch pack disposed between said clutch housing and said hub;

a clutch pack pressure plate drivably connected to said clutch housing;

spring means between said clutch housing and said pressure plate for normally applying an engaging force to said clutch pack;

a ball ramp mechanism having a pair of annular side members with juxtaposed adjacent surfaces, at least one of said surfaces having a ball ramp thereon;

a ball actuator element in said ramp between said side members;

an electromagnetic actuator including a coil member, a coil housing member and an armature adjacent said coil housing member;

said armature being grounded to said transmission mechanism housing;

one of said electromagnetic actuator members being connected to said transmission mechanism housing and the other electromagnetic actuator member being connected to one of said side members, the other side member being connected to said clutch assembly torque output shaft; and means for transferring motion of said other side member to said pressure plate whereby said clutch pack is disengaged when said oil member is energized.

7. The clutch assembly as set forth in claim 6 wherein said electromagnetic clutch actuator creates a friction braking force as said armature and said one electromagnetic actuator member are frictionally engaged as said coil member is energized, thereby establishing synchronous speed of said pinions and gears with respect to said mainshaft and said countershaft during ratio changes as said synchronizer clutch means is activated.

8. The clutch assembly as set forth in claim 7 wherein said clutch pack has first multiple friction discs connected to said clutch housing and second multiple friction discs connected to said clutch assembly hub;

said friction braking force opposing friction creep torque transfer through said clutch pack when said clutch assembly is disengaged with said engine operating and with one of said synchronizer clutch means activated.

9. The clutch assembly as set forth in claim 8 wherein said motion transferring means comprises at least one axially shiftable pin extending through said clutch assembly hub and a thrust ring between said clutch assembly hub and said pressure plate, one end of said pin being engageable with said other side member and with said thrust ring.

10. The clutch assembly as set forth in claim 9 including a spring element disposed between said other side member and said clutch assembly hub whereby said ball ramp mechanism assumes an assembled state when said clutch assembly is disengaged.

11. The clutch assembly as set forth in claim 10 including an electronic controller connected to said electromagnetic actuator coil member;

sensor means for determining driveline variables including driver activated sensors, engine sensors and transmission mechanism sensors, said sensors being connected to said controller;

said controller including memory storage registers for storing input information from said sensor, and a processor unit for developing output control signals for said coil member and for storing clutch assembly engagement and release logic whereby the clutch assembly engagement force of said clutch assembly is modulated during clutch assembly engagement and disengagement intervals in accordance with instantaneous driveline torque requirements during ratio changes and during start-up of the vehicle driveline.

* * * * *